United States Patent
Inomata

(10) Patent No.: US 8,923,555 B2
(45) Date of Patent: Dec. 30, 2014

(54) IMAGE MEASURING DEVICE, IMAGE MEASURING METHOD, AND COMPUTER PROGRAM

(75) Inventor: Masahiro Inomata, Osaka (JP)

(73) Assignee: Keyence Corporation, Osaka (JP)

( * ) Notice: Subject to any disclaimer, the term of this patent is extended or adjusted under 35 U.S.C. 154(b) by 503 days.

(21) Appl. No.: 13/267,339

(22) Filed: Oct. 6, 2011

(65) Prior Publication Data

US 2012/0106788 A1 May 3, 2012

(30) Foreign Application Priority Data

Oct. 29, 2010 (JP) .................................. 2010-244329

(51) Int. Cl.
| | | |
|---|---|---|
| G06K 9/00 | (2006.01) | |
| G01B 11/00 | (2006.01) | |
| G01B 11/26 | (2006.01) | |
| G01B 11/02 | (2006.01) | |
| G06T 3/00 | (2006.01) | |
| G11B 27/00 | (2006.01) | |

(52) U.S. Cl.
CPC .............. *G01B 11/00* (2013.01); *G01B 11/26* (2013.01); *G01B 11/02* (2013.01); *G06T 3/00* (2013.01); *G11B 27/00* (2013.01); *G06K 9/00* (2013.01)
USPC ........................................................ 382/103

(58) Field of Classification Search
CPC ........... A61K 31/4025; A61K 31/4436; A61K 47/12; A61K 9/0048; G01B 11/00
USPC ....................................................... 382/103
See application file for complete search history.

(56) References Cited

U.S. PATENT DOCUMENTS

| | | | | |
|---|---|---|---|---|
| 5,684,887 A | * | 11/1997 | Lee et al. | 382/107 |
| 5,748,775 A | * | 5/1998 | Tsuchikawa et al. | 382/190 |
| 5,956,434 A | * | 9/1999 | Shibata et al. | 382/278 |
| 7,292,711 B2 | * | 11/2007 | Kiraly et al. | 382/103 |
| 7,300,356 B2 | * | 11/2007 | Nishino et al. | 473/131 |
| 7,308,128 B2 | | 12/2007 | Inomata | |
| 7,324,663 B2 | * | 1/2008 | Kiraly | 382/103 |
| 2004/0197075 A1 | * | 10/2004 | Aiso | 386/46 |
| 2008/0297596 A1 | | 12/2008 | Inomata et al. | |
| 2008/0297597 A1 | | 12/2008 | Inomata et al. | |
| 2009/0102938 A1 | | 4/2009 | Takahashi et al. | |
| 2009/0189994 A1 | | 7/2009 | Shimonaka | |
| 2011/0058754 A1 | * | 3/2011 | Lee et al. | 382/305 |
| 2012/0106869 A1 | * | 5/2012 | Machitani et al. | 382/284 |

FOREIGN PATENT DOCUMENTS

| | | | | |
|---|---|---|---|---|
| CN | 102073265 | * | 5/2011 | G04B 9/00 |
| JP | 2000-230808 | | 8/2000 | |
| JP | 2006-119107 | | 5/2006 | |
| JP | 2007-172393 | | 7/2007 | |

(Continued)

*Primary Examiner* — Tom Y Lu
(74) *Attorney, Agent, or Firm* — Kilyk & Bowersox, P.L.L.C.

(57) ABSTRACT

Provided are an image measuring device, an image measuring method, and a computer program, capable of performing accurate calibration and accurately measure a desired physical quantity even in a case of an object to be measured having a shape in which selection and tracking of target points are difficult or an object to be measured moving as time elapses. Frame images are played back frame by frame, and selection of a plurality of frame images is accepted from frame images played back frame by frame. A synthesized image in which the selected and accepted frame images are superimposed is generated. The generated synthesized image is displayed, and a predetermined physical quantity is measured on the displayed synthesized image.

19 Claims, 14 Drawing Sheets

(56) References Cited

FOREIGN PATENT DOCUMENTS

| | | |
|---|---|---|
| JP | 2008-090072 | 4/2008 |
| JP | 2009-141709 | 6/2009 |
| JP | 2009-141710 | 6/2009 |
| JP | 2009-177537 | 8/2009 |

* cited by examiner

IMAGE MEASURING DEVICE, IMAGE MEASURING METHOD, AND COMPUTER PROGRAM

CROSS-REFERENCE TO RELATED APPLICATIONS

The present application claims foreign priority based on Japanese Patent Application No. 2010-244329, filed Oct. 29, 2010, the contents of which is incorporated herein by reference.

BACKGROUND OF THE INVENTION

1. Field of the Invention

The present invention relates to an image measuring device capable of measuring a desired physical quantity based on a moving image captured by an imaging unit, an image measuring method capable of being executed by the image measuring device, and a computer program for causing a computer to execute a process of the image measuring method.

2. Description of Related Art

Conventionally, there have been developed image measuring devices which capture moving images of objects to be measured by imaging units, select target points of the captured moving images, and automatically track the target points so as to measure moving distances, speeds, acceleration, and the like of the target points. For example, Japanese Unexamined Patent Publication No. 2009-141709 discloses a moving image imaging apparatus for executing high-speed imaging for capturing instantaneously images as a continuous plurality of frame images whose imaging cycle is short so as to capture high-speed moving images.

In the moving image imaging apparatus disclosed in Japanese Unexamined Patent Publication No. 2009-141709, a position of a camera as an imaging unit is fixed, and a target point of a moving object to be measured is tracked by using frame images so as to be capable of measuring a moving distance, a speed, and acceleration of the target point.

However, when it is difficult to select a target point in such a case where a shape and an operation of an object to be measured are complicated, measurements cannot be carried out with sufficient accuracy by conventional image measuring methods. Further, it is occasionally difficult to determine whether a selected target point shows a desired motion of the object to be measured. In the conventional image measuring method, depending on shapes of objects to be measured, it is difficult to track target points by using frame images or the tracking cannot be performed. Therefore, a moving distance, a speed, and acceleration of a target point cannot be measured.

A plurality of frame images are still images at respective moments and thus it is difficult to correct a capturing position of an object to be measured that moves as time elapses. For this reason, a moving distance, a speed, and acceleration of the target point cannot be measured.

When calibration is performed, it is necessary to capture an object to be measured whose dimension is well known, such as a ruler, together with the object to be measured. However, when the shape of the object to be measured is complicated, the ruler cannot be always arranged in front of an imaging unit, and thus the dimension may fluctuate, whereby accurate calibration cannot be performed.

SUMMARY OF THE INVENTION

The present invention is devised in view of the above problems, and aims to provide an image measuring device for accurately measuring a desired physical quantity of even an object to be measured having a complicated shape in which selecting a target point, tracking a target point, or the like is difficult, or even an object to be measured moving as time elapses, an image measuring method capable of being executed by the image measuring device, and a computer program for causing a computer to execute a process in the image measuring method.

In order to achieve the above object, according to one embodiment of the present invention, there is provided an image measuring device for measuring a physical quantity based on a moving image including a plurality of frame images obtained by capturing an object to be measured by an imaging unit, the image measuring device including a frame-by-frame playback unit for playing back the frame images frame by frame, an image selection accepting unit for accepting selection of the plurality of frame images from the frame images played back frame by frame, a synthesized image generating unit for generating a synthesized image obtained by superimposing the selected and accepted frame images, a synthesized image display unit for displaying the generated synthesized image, and a measuring unit for measuring a predetermined physical quantity on the displayed synthesized image.

According to another embodiment of the present invention, in the image measuring device according to the first aspect, the frame-by-frame playback unit sequentially superimposes the frame images to be played back frame by frame on the frame images that are firstly selected and accepted, and displays the superimposed images.

According to another embodiment of the present invention, the image measuring device according to the first or second aspect further includes a thumbnail image generating unit for generating thumbnail images of the selected and accepted plurality of frame images, and a thumbnail image display unit for displaying the generated thumbnail images together with identification information for identifying the original frame images.

According to another embodiment of the present invention, in the image measuring device according to any one of the first to third aspects, the identification information is related with the selected and accepted plurality of frame images, and these frame images are displayed in distinction from the other frame images.

According to another embodiment of the present invention, in the image measuring device according to any one of the first to fourth aspects, a profile image to which a profile line is given is superimposed on the selected and accepted plurality of frame images, and the superimposed images are displayed.

According to another embodiment of the present invention, in the image measuring device according to any one of the first to fifth aspects, the synthesized image display unit displays the measured physical quantity together with a time difference between the frame images.

According to another embodiment of the present invention, in the image measuring device according to any one of the first to sixth aspects, a ball whose dimension is well known is arranged so as to appear on the moving image of the object to be measured, and calibration is performed based on the moving image obtained by capturing the object to be measured and the ball by the imaging unit.

According to another embodiment of the present invention, the image measuring device according to the seventh aspect further includes a ball extracting unit for extracting the ball from the obtained moving image, wherein the calibration is performed based on the extracted ball.

According to another embodiment of the present invention, in the image measuring device according to the seventh aspect, a pattern capable of being discriminated is given to a surface of the ball, and the pattern is detected so that the calibration is performed based on the detected pattern.

According to another embodiment of the present invention, in the image measuring device according to any one of the seventh to ninth aspects, the ball is illuminated.

In order to achieve the above object, according to another embodiment of the present invention, there is provided an image measuring method which is executed by an image measuring device for measuring a physical quantity based on a moving image including a plurality of frame images obtained by capturing an object to be measured by an imaging unit, the method including a frame-by-frame playback step of playing back the frame images frame by frame, an image selection accepting step of accepting selection of a plurality of frame images from the frame images played back frame by frame, a synthesized image generating step of generating a synthesized image obtained by superimposing the selected and accepted frame images, a synthesized image display step of displaying the generated synthesized image, and a measuring step of measuring a predetermined physical quantity on the displayed synthesized image.

According to another embodiment of the present invention, in the image measuring method according to the eleventh aspect, the frame images to be played back frame by frame are sequentially superimposed on the frame images that are firstly selected and accepted, and the superimposed images are displayed.

According to another embodiment of the present invention, the image measuring method according to the eleventh or twelfth aspect further includes a thumbnail image generating step of generating thumbnail images of the selected and accepted plurality of frame images, and a thumbnail image display step of displaying the generated thumbnail images together with identification information for identifying the original frame images.

According to another embodiment of the present invention, in the image measuring method according to any one of the eleventh to thirteenth aspects, the identification information is related with the selected and accepted plurality of frame images, and these images are displayed in distinction from the other frame images.

According to another embodiment of the present invention, in the image measuring method according to any one of the eleventh to fourteenth aspects, a profile image to which a profile line is given is superimposed on the selected and accepted plurality of frame images, and the superimposed images are displayed.

According to another embodiment of the present invention, in the image measuring method according to any one of the eleventh to fifteenth aspects, the measured physical quantity is displayed together with a time difference between the frame images.

According to another embodiment of the present invention, in the image measuring method according to any one of the eleventh to sixteenth aspects, a ball whose dimension is well known is arranged so as to appear on the moving image of the object to be measured, and calibration is performed based on the moving image obtained by capturing the object to be measured and the ball by the imaging unit.

According to another embodiment of the present invention, the image measuring method according to the seventeenth aspect further includes a ball extracting step of extracting the ball from the obtained moving image, wherein the calibration is performed based on the extracted ball.

According to another embodiment of the present invention, in the image measuring method according to the seventeenth aspect, a pattern capable of being discriminated is given to a surface of the ball, and the pattern is detected and the calibration is performed based on the detected pattern.

According to another embodiment of the present invention, in the image measuring method according to any one of the seventeenth to nineteenth aspects, the ball is illuminated.

In order to achieve the above objects, according to another embodiment of the present invention, there is provided a computer program which is executed by an image measuring device for measuring a physical quantity based on a moving image including a plurality of frame images obtained by capturing an object to be measured by an imaging unit, the computer program for causing the image measuring device to function as a frame-by-frame playback unit for playing back the frame images frame by frame, an image selection accepting unit for accepting selection of the plurality of frame images from the frame images played back frame by frame, a synthesized image generating unit for generating a synthesized image obtained by superimposing the selected and accepted frame images, a synthesized image display unit for displaying the generated synthesized image, and a measuring unit for measuring a predetermined physical quantity on the displayed synthesized image.

According to another embodiment of the present invention, in the computer program according to the twenty-first aspect, the frame-by-frame playback unit is caused to function as a unit for sequentially superimposing the frame images to be played back frame by frame on the frame images that are firstly selected and accepted, and displaying the superimposed images.

According to another embodiment of the present invention, in the computer program according to the twenty-first or twenty-second aspect, the image measuring device is caused to function as a thumbnail image generating unit for generating thumbnail images of the selected and accepted plurality of frame images, and a thumbnail image display unit for displaying the generated thumbnail images together with identification information for identifying the original frame images.

According to another embodiment of the present invention, in the computer program according to any one of the twenty-first to twenty-third aspect, the image measuring device is caused to function as a unit for relating the identification information with the selected and accepted plurality of frame images, and displaying these frame images in distinction from the other frame images.

According to another embodiment of the present invention, in the computer program according to any one of the twenty-first to twenty-fourth aspect, the image measuring device is caused to function as a unit for superimposing a profile image to which a profile line is given on the selected and accepted plurality of frame images, and displaying the superimposed images.

According to another embodiment of the present invention, in the computer program according to any one of the twenty-first to twenty-fifth aspect, the synthesized image display unit is caused to function as a unit for displaying the measured physical quantity together with a time difference between the frame images.

According to another embodiment of the present invention, in the computer program according to any one of the twenty-first to twenty-sixth aspect, a ball whose dimension is well known is arranged so as to appear on the moving image of the object to be measured, and the image measuring device is caused to function as a unit for obtaining a moving image by capturing the object to be measured and the ball by the imaging unit, and a unit for performing the calibration based on the obtained moving image.

According to another embodiment of the present invention, in the computer program according to the twenty-seventh aspect, the image measuring device is caused to function as a ball extracting unit for extracting the ball from the obtained moving image, and a unit for performing the calibration based on the extracted ball.

According to another embodiment of the present invention, in the computer program according to the twenty-seventh aspect, a pattern capable of being discriminated is given to a surface of the ball, and the image measuring device is caused to function as a unit for detecting the pattern so as to perform the calibration based on the detected pattern.

In the first, eleventh and twenty-first aspects of the embodiments, the selection of the plurality of frame images from the frame images played back frame by frame is accepted, and the synthesized image in which the selected and accepted frame images are superimposed is generated. The generated synthesized image is displayed, and a desired physical quantity is measured on the displayed synthesized image. Since the selected and accepted frame images are still images, the synthesized image obtained by superimposing the still images is also a still image. Therefore, the measuring method for a still image can be applied even to an object to be measured that moves as time elapses and to an object to be measured having a complicated shape, and a desired physical quantity, such as a moving distance, a speed, or acceleration can be measured without a complicated image process.

In the second, twelfth, and twenty-second aspects of the embodiments, the frame images to be played back frame by frame are sequentially superimposed on the frame images that are firstly selected and accepted, and the superimposed images are displayed. As a result, a state in which a target point sequentially moves can be visually checked, and a desired physical quantity, such as a moving distance, a speed, or acceleration can be reliably measured.

In the third, thirteenth, and twenty-third aspects of the embodiments, the thumbnail images of the selected and accepted plurality of frame images are generated, and the generated thumbnail images are displayed together with identification information for identifying the original frame images. As a result, the frame images whose physical quantity is to be measured can be clearly discriminated from the other frame images, thereby preventing a situation where the measurement is carried out by using improper frame images.

In the fourth, fourteenth, and twenty-fourth aspects of the embodiments, identification information is related with the selected and accepted plurality of frame images, and these frame images are displayed in distinction from the other frame images. As a result, the frame images whose physical quantity is to be measured can be clearly discriminated from the other frame images, thereby preventing the situation where the measurement is carried out by using improper frame images.

In the fifth, fifteenth, and twenty-fifth aspects of the embodiments, the profile image to which the profile line is given is superimposed on the selected and accepted plurality of frame images, and the superimposed images are displayed. As a result, a change in a target point to be measured becomes more clear, and the physical quantity can be measured more accurately.

In the sixth, sixteenth, and twenty-sixth aspects of the embodiments, the measured physical quantity is displayed together with a time difference between the frame images. As a result, not only a moving distance but also a speed, and acceleration can be measured as the desired physical quantity.

In the seventh, seventeenth, and twenty-seventh aspects of the embodiments, the ball whose dimension is well known is arranged so as to appear on the moving image of the object to be measured. The moving image in which the object to be measured and the ball are captured by the imaging unit is obtained, and the calibration is performed based on the obtained moving image. As a result, even if the image capturing is performed from any direction, the ball that is captured as a circle in a two-dimensional image is used as a reference at the time of the calibration, so that the accurate calibration can be performed.

In the eighth, eighteenth, and twenty-eighth aspects of the embodiments, the ball is extracted from the obtained moving image, and the calibration is performed based on the extracted ball. As a result, even if the image capturing is performed from any direction, the ball that is captured as a circle in a two-dimensional image is used as a reference at the time of the calibration, so that the accurate calibration can be performed.

In the ninth, nineteenth, and twenty-ninth aspects of the embodiments, the pattern that can be discriminated is given to the surface of the ball, and the pattern is detected so that the calibration is performed based on the detected pattern. As a result, a dimension of the pattern is automatically recognized, and the calibration can be automatically performed.

In the tenth and twentieth aspects of the embodiments, the ball is illuminated, so that the ball can be easily extracted from the obtained moving image, and the calibration can be accurately performed.

According to the above configurations, the generated synthesized image is displayed, and the predetermined physical quantity is measured on the displayed synthesized image. Since the selected and accepted frame images are still images, the synthesized image obtained by superimposing the still images is also a still image. Therefore, the measuring method for a still image can be applied even to an object to be measured that moves as time elapses and to an object to be measured having a complicated shape, and a desired physical quantity, such as a moving distance, a speed, or acceleration can be measured without a complicated image process. Moreover, even if the image capturing is performed from any direction, the ball that is captured as a circle in a two-dimensional image is used as a reference at the time of the calibration, so that the accurate calibration can be performed.

DETAILED DESCRIPTION OF PREFERRED EMBODIMENTS

Figure 1:
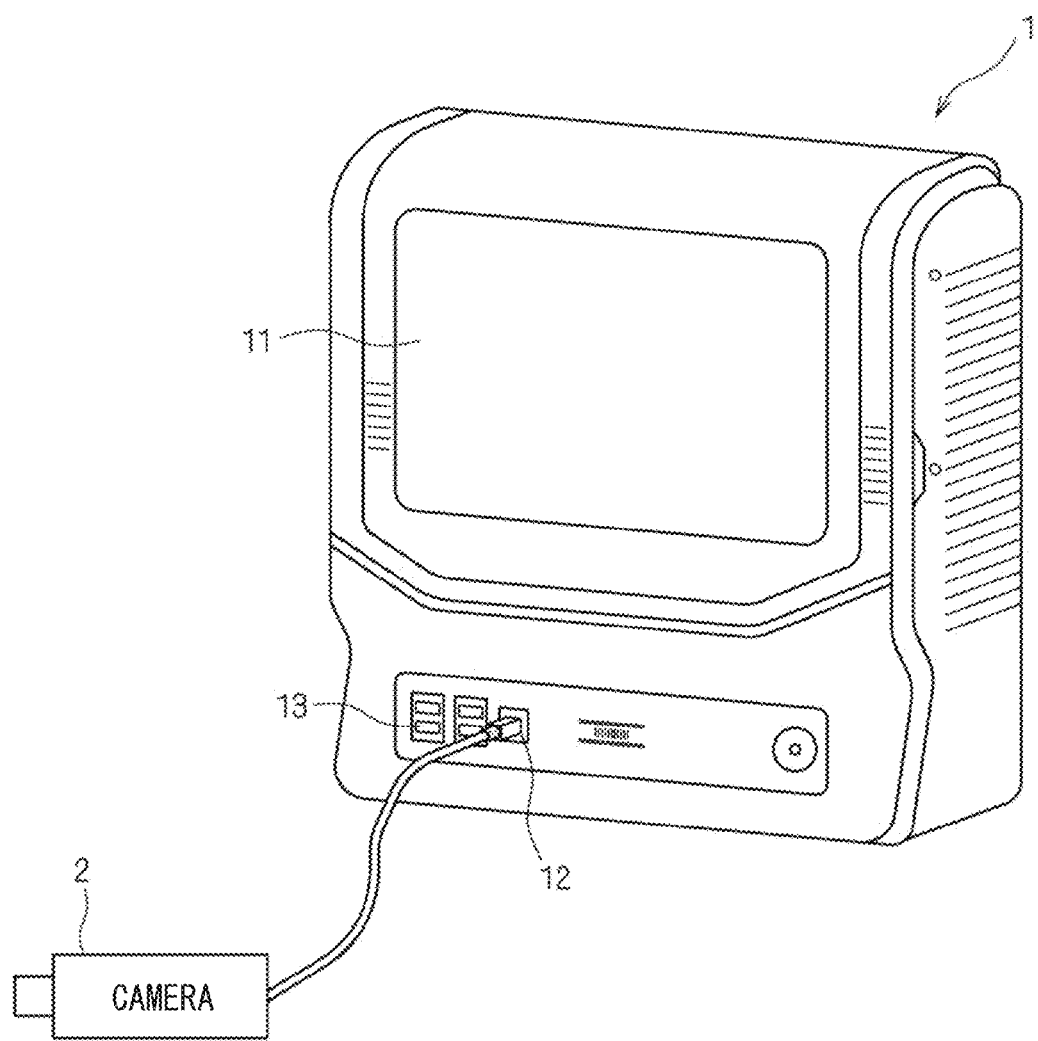
FIG. 1 is a perspective view illustrating an appearance of an image measuring device according to a first embodiment of the present invention.

An image measuring device according to embodiments of the present invention will be described below with reference to the drawings. The same or similar configurations and functions in the drawings are denoted by the same reference symbols, and detailed description thereof will be omitted.

First Embodiment

FIG. 1 is a perspective view illustrating an appearance of the image measuring device according to a first embodiment of the present invention. As shown in FIG. 1, an image measuring device 1 according to the first embodiment has a housing integral with a display device 11, and is provided with a video interface 12, a communication interface 13, and the like on a lower portion of a front surface. The video interface 12 is connected to a camera 2 as an imaging unit via a cable. The communication interface 13 is connected to enable data communication with an external device.

Figure 2:
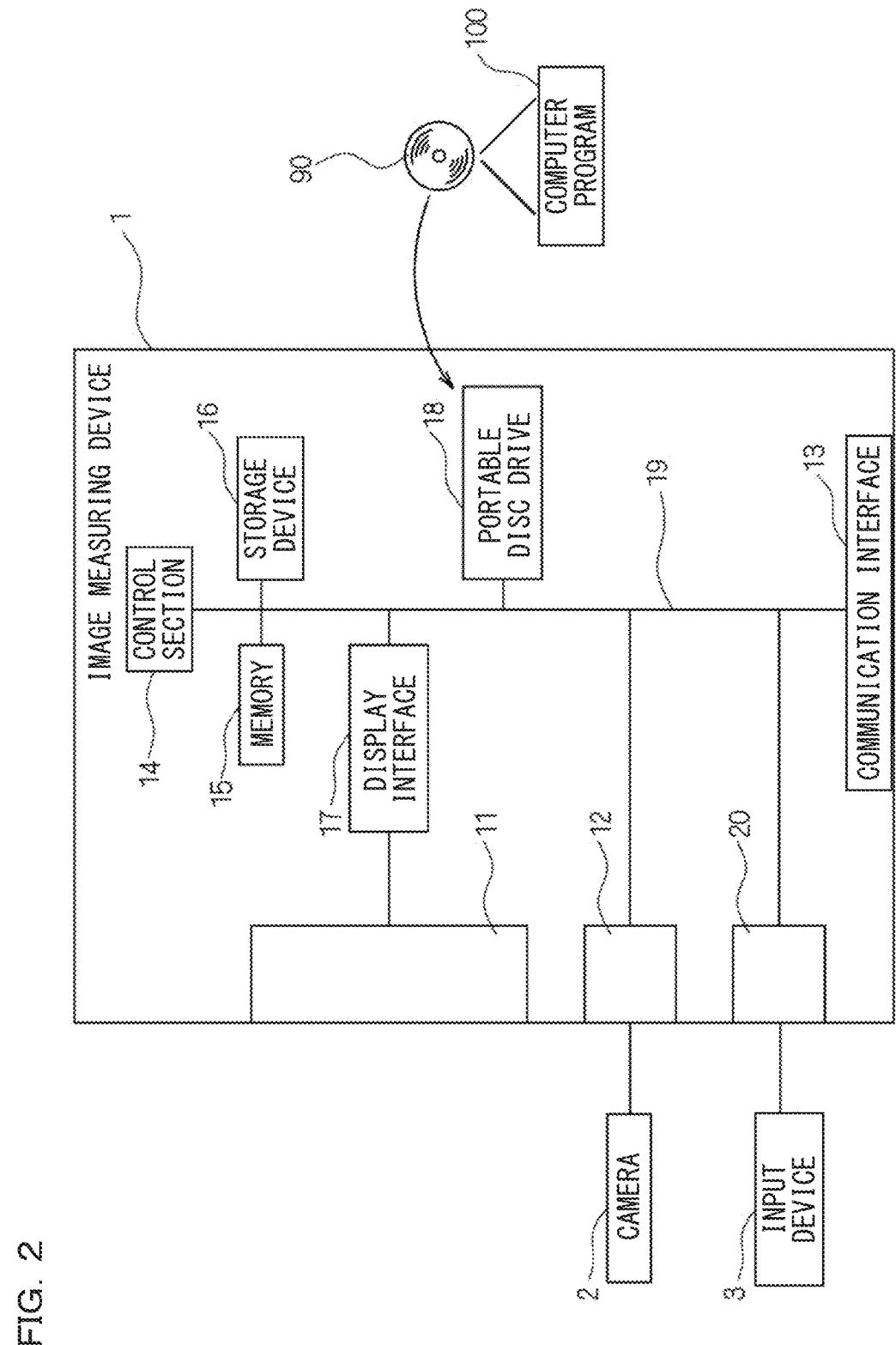
FIG. 2 is a block diagram illustrating the image measuring device according to the first embodiment of the present invention.

FIG. 2 is a block diagram illustrating a configuration of the image measuring device 1 according to the first embodiment of the present invention. As shown in FIG. 2, the image measuring device 1 according to the first embodiment has the housing integral with the display device 11, and is configured by a control section 14 including at least CPU (central processing unit) and an LSI, a memory 15, a storage device 16, a display interface 17, the communication interface 13, the video interface 12, an input interface 20, a portable disc drive 18, and an internal bus 19. The display interface 17 is connected to the display device 11. The communication interface 13 is connected to enable data communication with an external device. The video interface 12 is connected to the camera (imaging unit) 2. The input interface 20 is connected to an input device 3. The internal bus 19 connects the above-described hardware.

The control section 14 is connected to respective sections of hardware of the image measuring device 1 via the internal bus 19, and controls operations of respective sections of the hardware. The control section 14 executes various software-like functions according to a computer program 100 stored in the storage device 16. The memory 15 is formed of a non-volatile memory such as SRAM or SDRAM. A load module is developed at the time of executing the computer program 100, and temporary data or the like generated upon the execution of the computer program 100 is stored in the memory 15.

The storage device 16 includes a built-in fixed-type storage device (hard disc, flash memory) or a ROM. The computer program 100 stored in the storage device 16 is downloaded by the portable disc drive 18 from a portable recording medium 90, such as a DVD, a CD-ROM, or a flash memory, that records information such as programs and data. Upon execution, the computer program 100 is developed from the storage device 16 to the memory 15 and executed. Needless to say, the computer program 100 may be downloaded from an external computer via the communication interface 13.

The communication interface 13 is connected to the internal bus 19. The communication interface 13 is connected to an external network such as the Internet, LAN, or WAN so as to be capable of establishing data communication with an external computer or the like. That is, the storage device 16 is not limited to the configuration of being built in the image measuring device 1, and may be an external recording medium such as a hard disc that is installed in an external server computer connected via the communication interface 13.

The input device 3 may be wired or wireless operation devices such as a pointing device such as a mouse, a console, a keyboard, or a remote control operation device, or a device, such as a touch panel integral with the display device 11, that obtains input information. The input device 3 is not particularly limited as long as it can input data.

The camera (imaging unit) 2 is a CCD camera or the like having a CCD imaging device, and captures a moving image including a plurality of frame images of an object to be measured. The display device 11 is a CRT, a liquid crystal panel, or the like. An external control device may be connected to the display device 11 via the communication interface 13. Examples of the external control device include general devices, such as a sensor, a wave gathering device, and PLC (programmable logic controller), which can give a trigger signal to be a reference of a later-described recording end timing to the control section 14.

Figure 3:
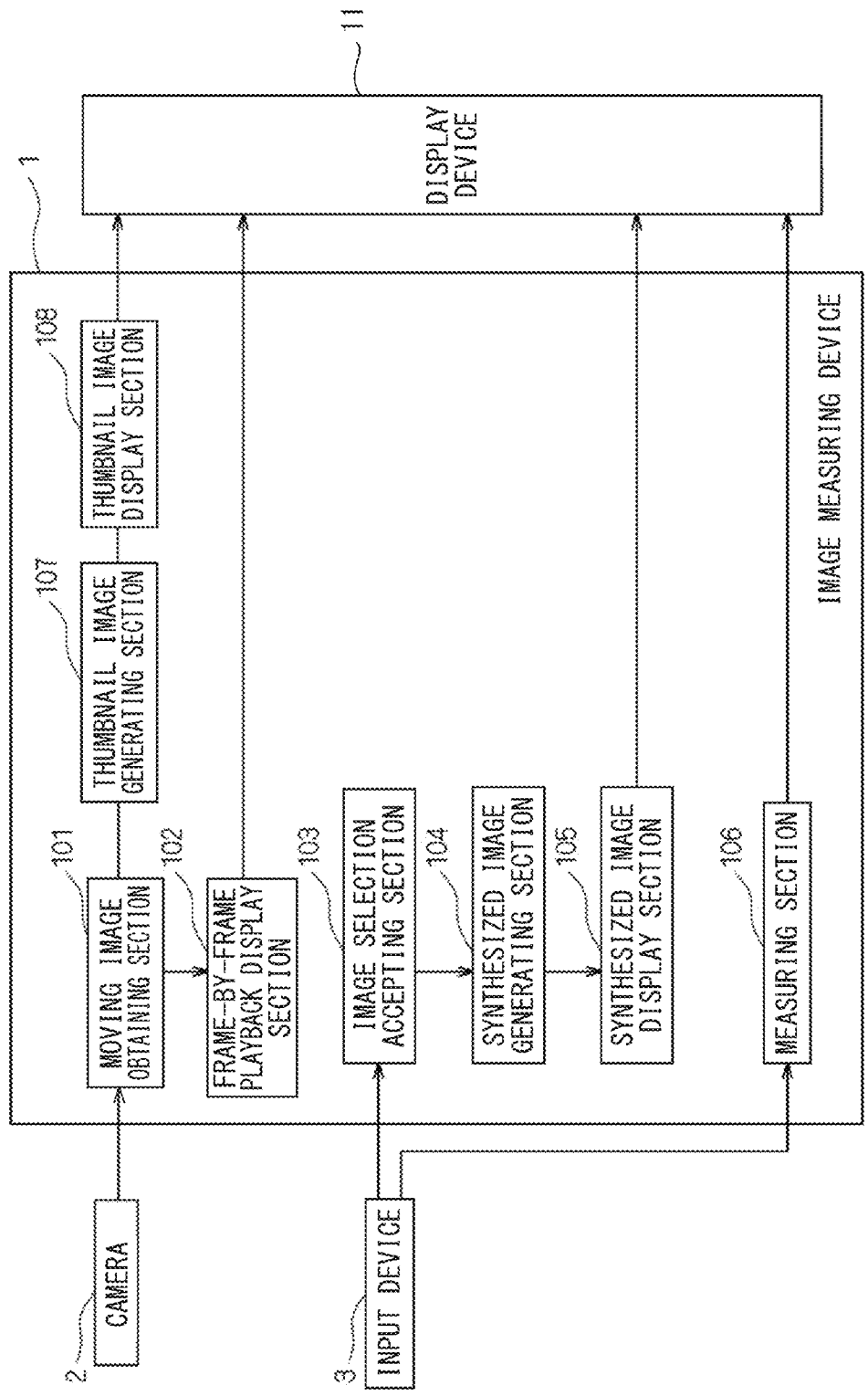
FIG. 3 is a functional block diagram illustrating one configuration example of the image measuring device according to the first embodiment of the present invention.

FIG. 3 is a functional block diagram illustrating one configuration example of the image measuring device 1 according to the first embodiment of the present invention. In FIG. 3, the camera 2 and the input device 3 are connected to the image measuring device 1 according to the first embodiment. Needless to say, a light source for illumination that illuminates an object to be measured may be provided.

The camera 2 functions as, for example, a digital camera, and carries out high-speed imaging. The high-speed imaging means that instantaneous motions of an object which are difficulty viewed by human's eyes are captured as a plurality of continuous frame images, and are captured at a photographing frame rate of, for example, between 100 fps (frame per second) and 1000000 fps. The camera 2 according to the first embodiment can photograph an object to be measured at the photographing frame rate of 15 fps or more to 32000 fps or less. The moving image in the first embodiment means an aggregate of a series of still images (frame images) sequentially captured at a predetermined photographing frame rate.

A moving image obtaining section 101 obtains a moving image of an object to be measured captured by the camera 2. In the first embodiment, when recording is started, a series of still images sequentially captured at a predetermined photographing frame rate is stored as a moving image sequentially in the memory 15. All or some of storage regions in the memory 15 forms a ring buffer, and the series of captured still images is sequentially stored in the ring buffer. When a trigger signal is input into the control section 14, the recording is ended. As a result, the aggregate of the series of still images sequentially captured at the predetermined photographing frame rate can be obtained as the moving image.

The trigger signal is given to the control section 14 by a user operating the input device 3. Instead of or in addition to the operation of the input device 3, a signal given from a sensor such as a pressure sensor, an acceleration sensor, or a sound sensor, a wave gathering device, or PLC (programmable logic controller) may be set as the trigger signal.

The control section 14 ends the recording after predetermined time from the input of the trigger signal based on a recording time set in advance according to the input of the trigger signal. By the ring buffer and the setting of the recording time, a moving image for a predetermined time before and/or after the input of the trigger signal can be obtained.

A frame-by-frame playback display section 102 plays back the plurality of frame images constituting the obtained moving image frame by frame and displays them on the display device 11. The frame-by-frame playback means that the user operates the input device 3 so that a series of still images sequentially captured is sent in forward order or in reverse order frame by frame so as to be displayed. Further, the frame-by-frame playback means that when the user stops the operation of the input device 3, the last selected still image is continuously displayed. For example, as described later, a slider is operated right and left or frame numbers of a frame number display region is changed, so that a forward button or a backward button is displayed on the display device 11, and the frame images are displayed one by one in forward order or in reverse order by clicking the mouse button each time. Alternatively, the frame images may be sequentially played back one by one by a rotating operation of a rotation knob such as a wheel of the mouse, and thus the frame images may be played back in the forward order or in the reverse order according to a rotating direction.

It is preferable that the frame-by-frame playback display section 102 sequentially superimposes the frame images to be played back frame by frame on the frame image that are firstly selected and accepted, and displays the superimposed images. This is because sequential motions of a target portion can be visually checked. In the superimposing of the frame images that are firstly selected and accepted and the frame images to be played back frame by frame, both the frame images may be averaged per pixel so that the superimposing is carried out, or a portion where a difference between both the frame images is large may be enhanced to be superimposed. Further, portions where a difference is large may be specified by a statistical process between both the frame images and another frame image or another plurality of frame images in the same moving image as both the frame images, and the specified portions may be enhanced to be superimposed.

An image selection accepting section 103 accepts, via the input device 3, selection of the plurality of frame images from the frame images that are played back frame by frame. Specifically, the image selection accepting section 103 accepts frame images representing a time point at which a target point starts to move and a time point at which the motion is ended, or frame images representing both ends of maximum amplitude.

It is preferable that identification information is related with the selected and accepted plurality of frame images, and these frame images are displayed so as to be discriminated from the other frame images. This is because a visual check can be made as to which frame image is used for the measurement.

A profile image to which a profile line is given may be superimposed on the selected and accepted plurality of frame images so that the images are displayed. When the images to which the profile line is given are displayed, a change in the target point to be measured becomes more clear, and thus a physical quantity can be measured more accurately.

Figure 4:
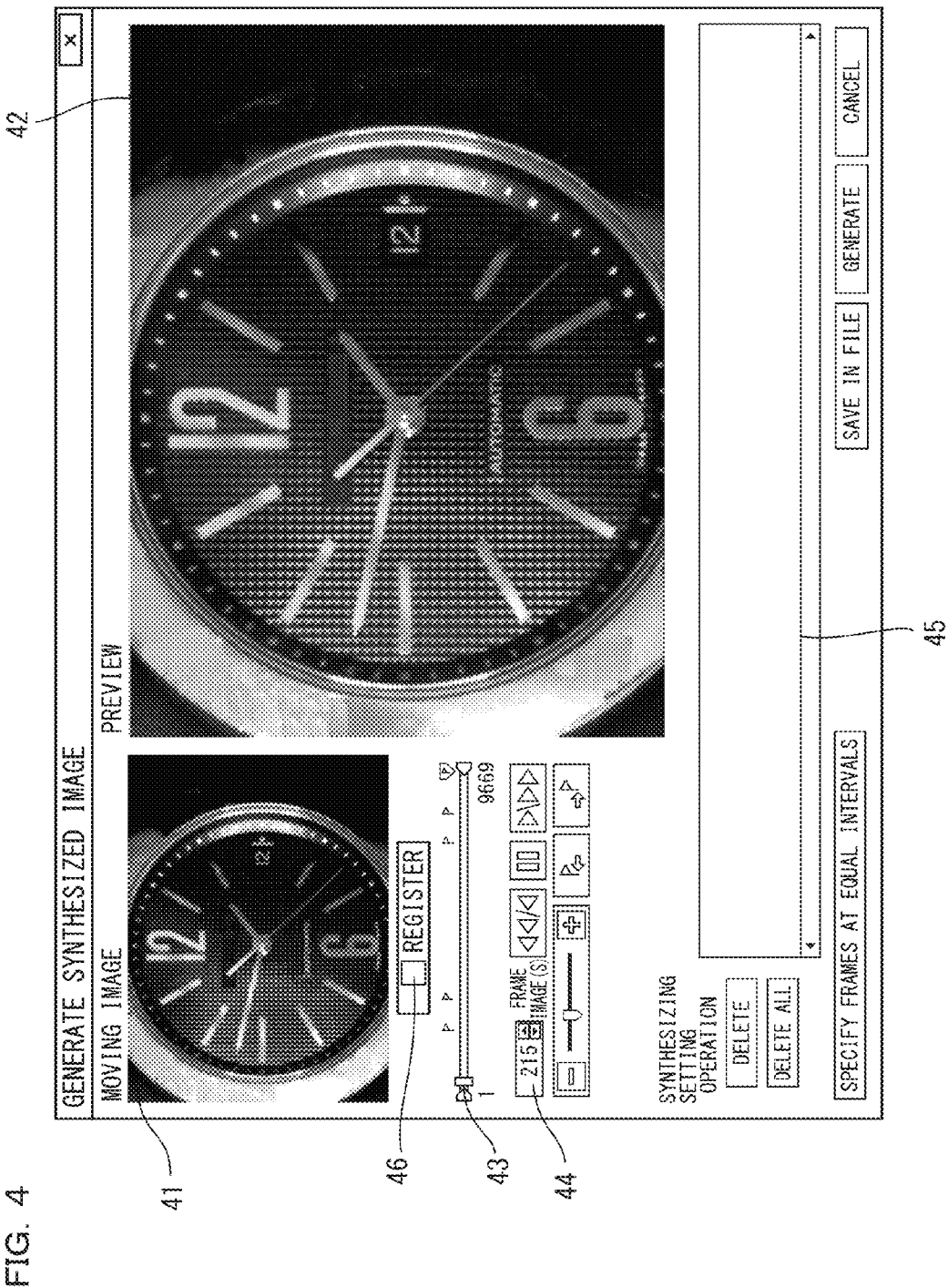
FIG. 4 is an illustrative diagram illustrating a synthesized image generating screen of the image measuring device according to the first embodiment of the present invention.
Figure 5:
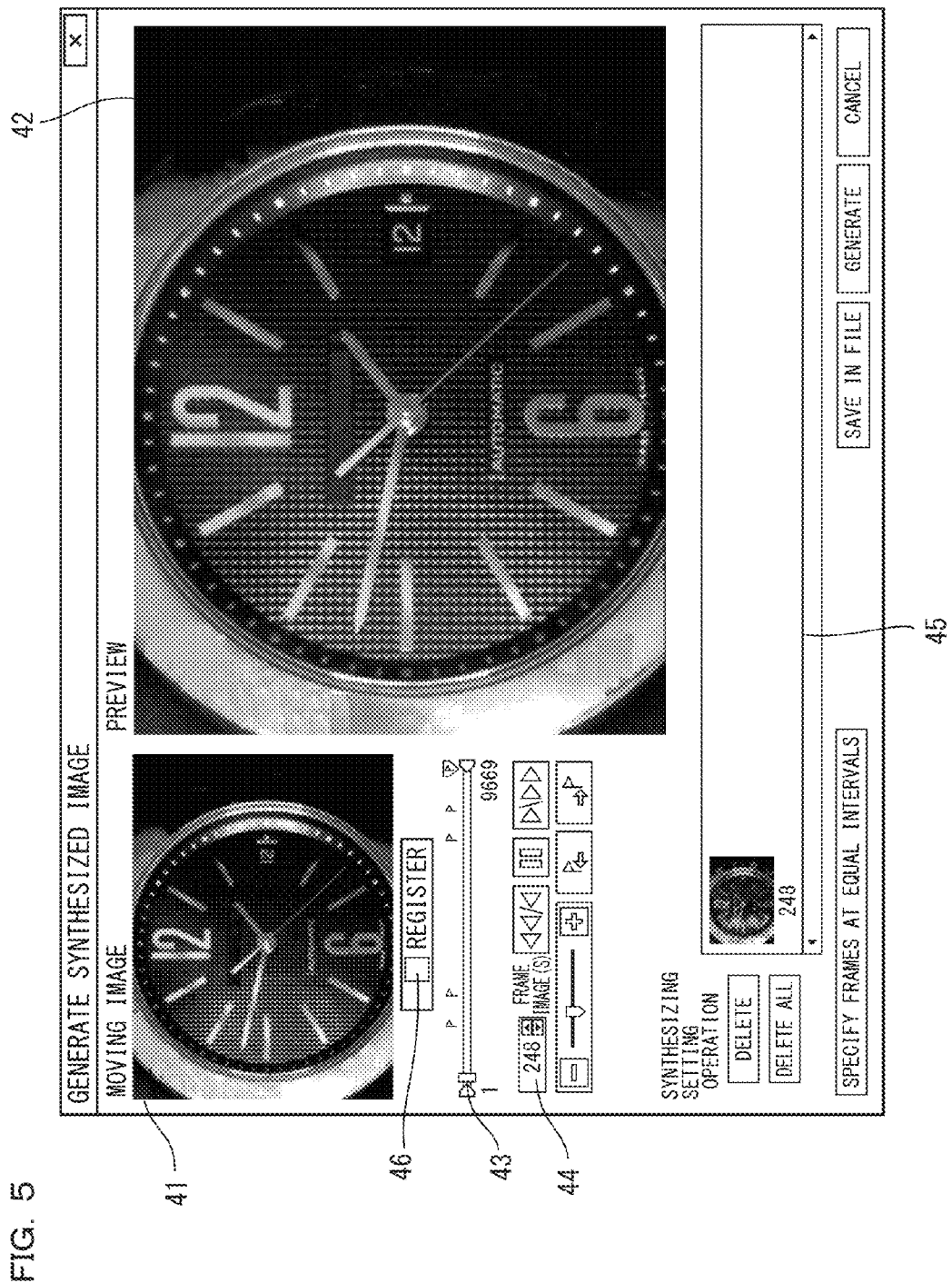
FIG. 5 is an illustrative diagram illustrating a synthesized image generating screen of the image measuring device according to the first embodiment of the present invention.
Figure 6:
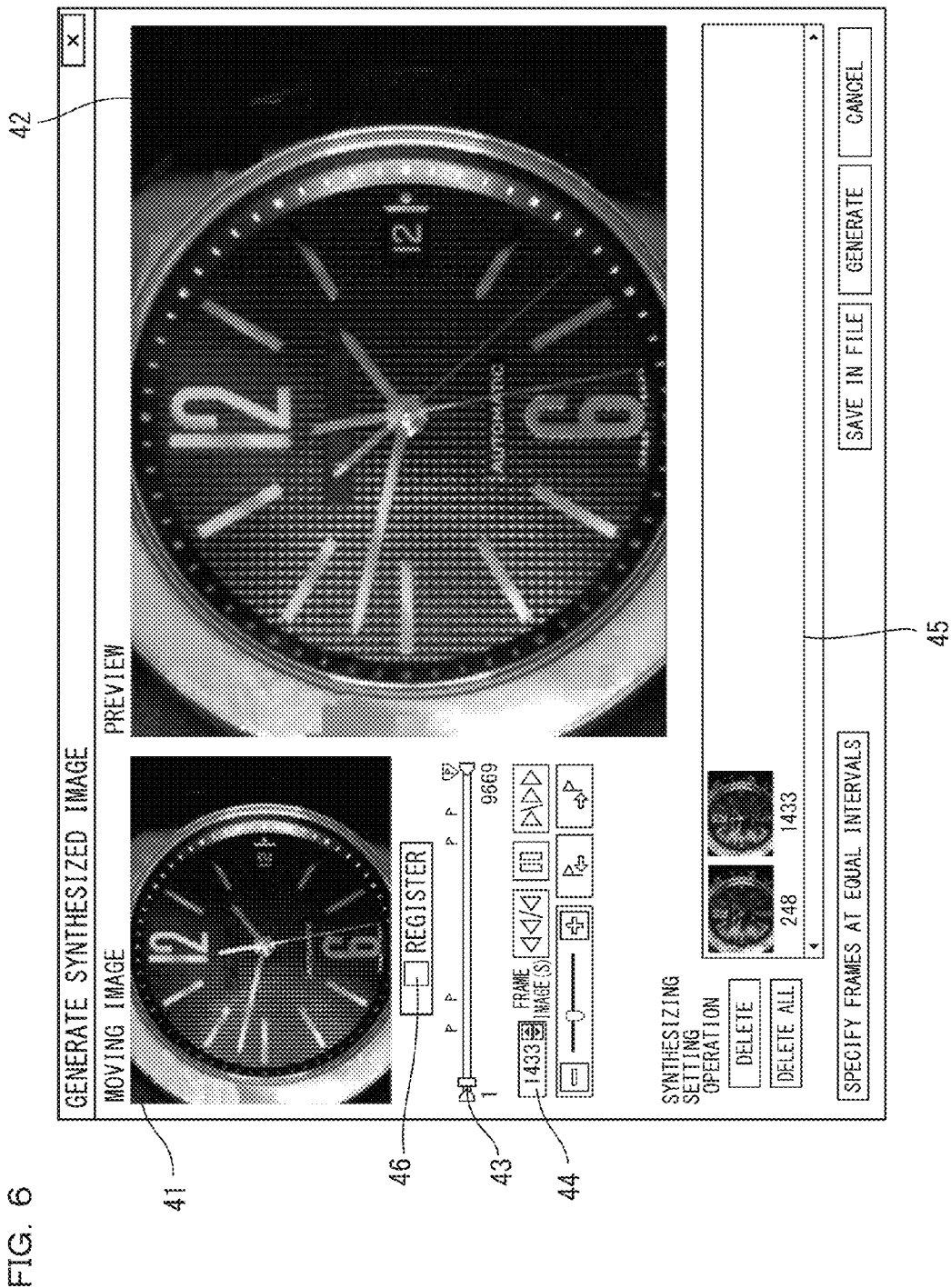
FIG. 6 is an illustrative diagram illustrating a synthesized image generating screen of the image measuring device according to the first embodiment of the present invention.

A synthesized image generating section 104 generates a synthesized image obtained by superimposing the selected and accepted frame images. A synthesized image display section 105 displays the generated synthesized image on the display device 11. FIG. 4 to FIG. 6 are illustrative diagrams illustrating a synthesized image generating screen of the image measuring device 1 according to the first embodiment of the present invention.

As shown in FIG. 4, frame images are played back frame by frame as a moving image on a moving image display region 41. The frame-by-frame playing-back operation of the frame images forward and backward can be performed by operating a slider 43 right and left, or changing a frame number of a frame number display region 44.

The same frame images as those in the moving image display region 41 are displayed on a preview screen display region 42 until a "register" button 46 is firstly selected. FIG. 5 illustrates the synthesized image generating screen in a case where the "register" button 46 is firstly selected.

When the "register" button 46 is firstly selected, frame images displayed on the moving image display region 41 at the selected time are copied and displayed on a synthesizing image display region 45. In an example of FIG. 5, frame images are displayed, and the frame numbers of the frame number display region 44 are also displayed.

Then, the moving image is played back frame by frame. At the time of the frame-by-frame playback, images displayed on the preview screen display region 42 are images in which frame images played back frame by frame on the moving image display region 41 are superimposed on frame images displayed on the moving image display region 41 at the time point when the "register" button 46 is firstly selected. FIG. 6 illustrates the synthesized image generating screen in a case where the "register" button 46 is again selected.

When the "register" button 46 is again selected, the frame image displayed on the moving image display region 41 at the time point it is selected is copied and displayed on the synthesizing image display region 45. In the example of FIG. 6, the frame image at the time point when the "register" button 46 is again selected is displayed, and the frame number of the frame number display region 44 is also displayed. At this time, a synthesized image showing two second hands as target points to be measured is displayed on the preview screen display region 42.

Thumbnail images of the selected and accepted plurality of frame images are displayed on the synthesizing image display region 45, so that a visual check can be made whether the frame images used for measurement are proper. With reference to FIG. 3, a thumbnail image generating section 107 generates thumbnail images of the selected and accepted plurality of frame images. A thumbnail image display section 108 displays the generated thumbnail images together with identification information for identifying original frame images, such as frame numbers.

Figure 7:
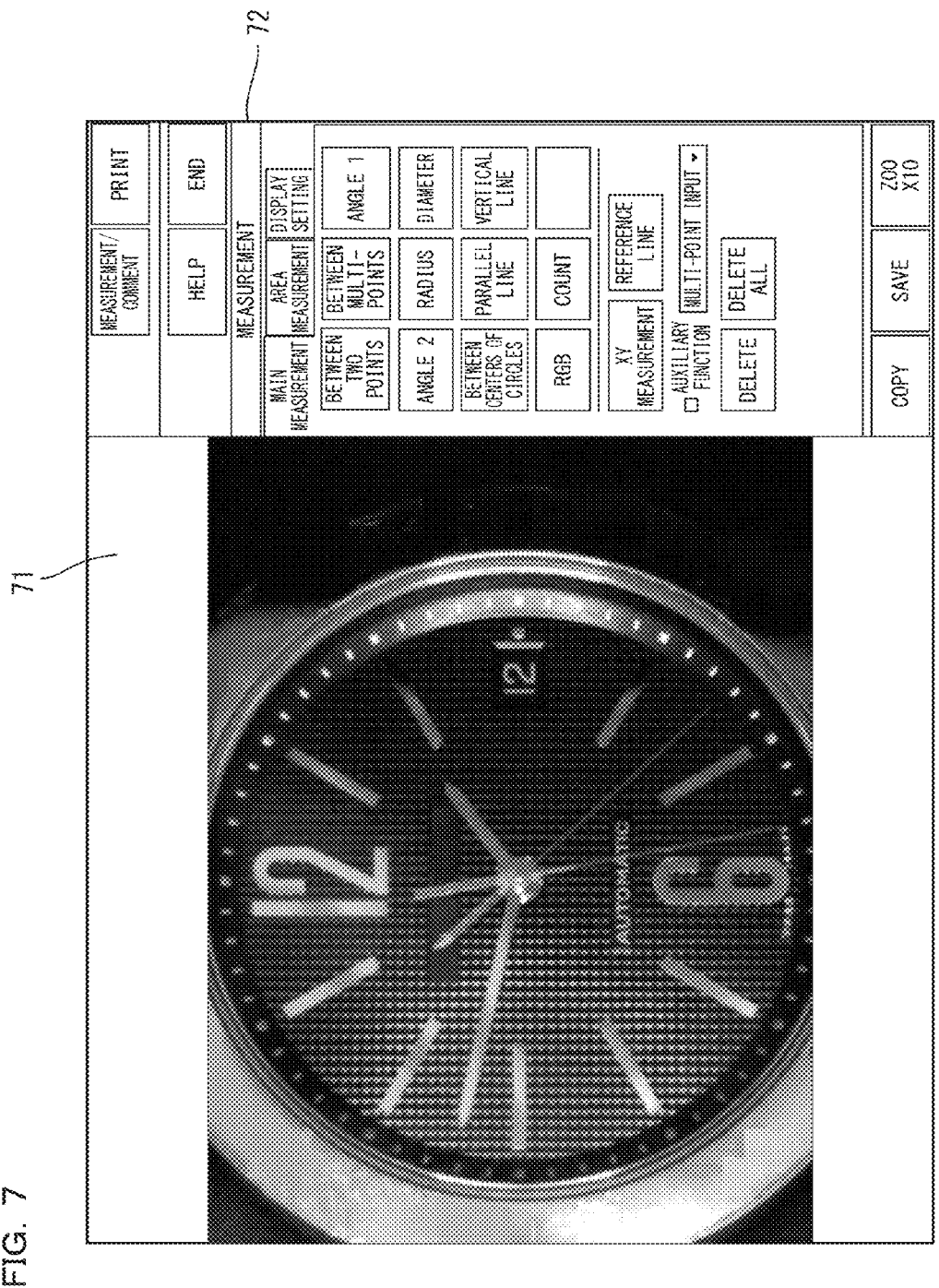
FIG. 7 is an illustrative diagram illustrating a measurement screen of the image measuring device according to the first embodiment of the present invention.

A measuring section 106 measures a desired physical quantity on the displayed synthesized image. FIG. 7 is an illustrative diagram illustrating a measurement screen of the image measuring device 1 according to the first embodiment of the present invention. On the measurement screen, the synthesized image displayed on the preview screen display region 42 in FIG. 6 is displayed on a synthesized image display region 71, and selection of an item to be measured is accepted so that the desired physical quantity is measured on a measurement item selection region 72.

Figure 8:
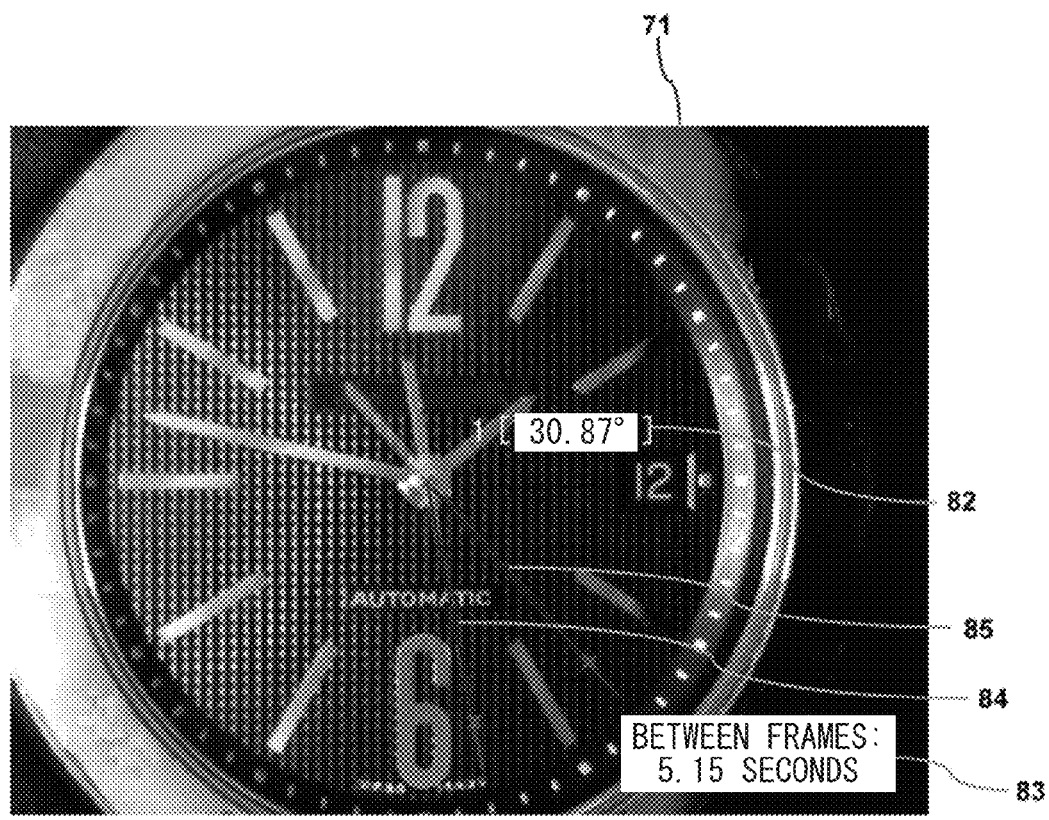
FIG. 8 is an illustrative diagram illustrating measurement with a measurement screen of the image measuring device according to the first embodiment of the present invention.

FIG. 8 is an illustrative diagram at the time of measurement on the measurement screen of the image measuring device 1 according to the first embodiment of the present invention. FIG. 8 illustrates a case where "angle 1" is selected as the item to be measured on the measurement item selection region 72 in FIG. 7.

When the selection of the "angle 1" is accepted and an instruction for selecting two second hands 84 and 85 of the synthesized image displayed on the synthesized image display region 71 is accepted as the measurement target, a measured value "30.87°" is displayed as an angle between the second hands as the measurement target on a measured value display region 82. It is preferable that the synthesized image display section 105 in FIG. 3 displays both the measured physical quantity and a time difference between the frame images. This is because not only a moving distance but also a speed and acceleration can be measured based on only the information displayed on the screen. In FIG. 8, a time difference between frame images to which the second hands whose angle is to be measured belong is displayed on a time difference display region 83.

In the image measuring device 1 according to the first embodiment of the present invention, a measurement line (for example, a segment on the two second hands 84 and 85 on the synthesized image) and a measurement point related with the item to be measured are specified directly on the displayed synthesized image using the input device 3. However, the measurement line and the measurement point related with the item to be measured may be specified on the original images of the synthesized image. The specified measurement line and the measurement point, then, may be synthesized and displayed on the synthesized image. Similarly to the case of directly specifying on the synthesized image via the input device 3, the measured value "30.87°" is displayed as the angle between the second hands to be measured on the measured value display region 82. The time difference between the frame images to which the second hands whose angle is to be measured may be displayed on the time difference display region 83.

Figure 9:
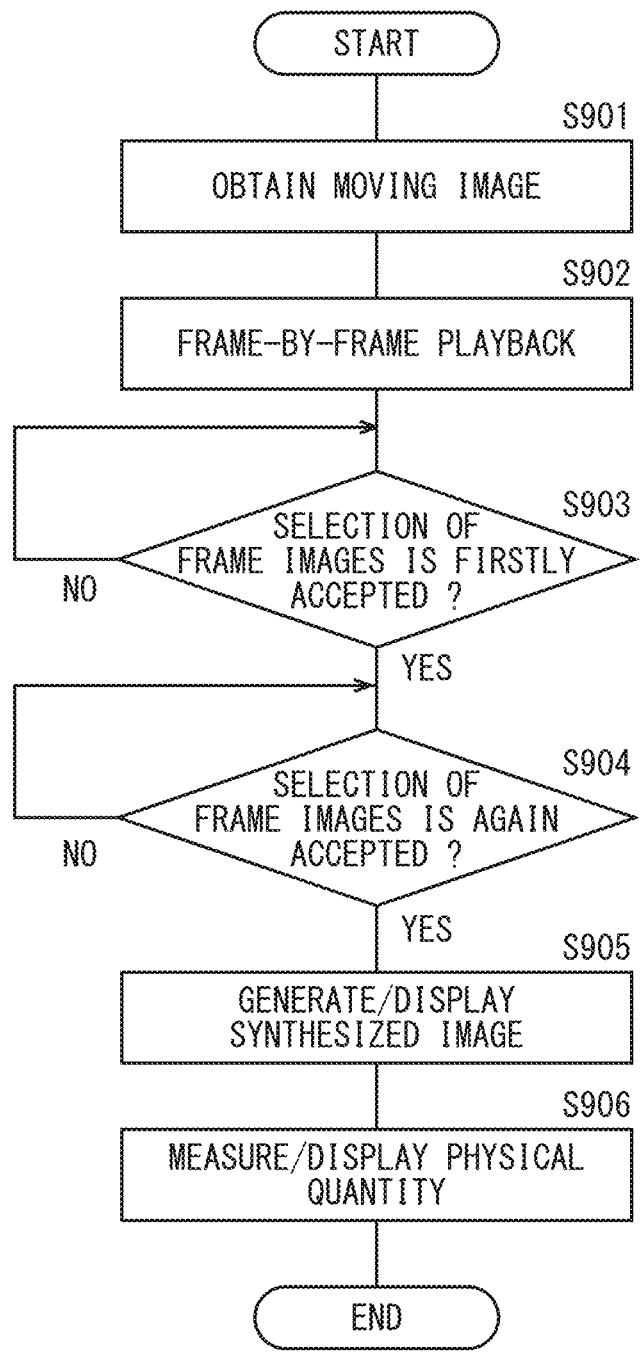
FIG. 9 is a flowchart illustrating a processing procedure of a control section of the image measuring device according to the first embodiment of the present invention.

FIG. 9 is a flowchart illustrating a processing procedure in the control section 14 of the image measuring device 1 according to the first embodiment of the present invention. The control section 14 of the image measuring device 1 obtains a moving image of an object to be measured captured by the camera 2 (step S901). In the first embodiment, an aggregate of a series of still images (frame images) that is sequentially captured at the predetermined frame rate is obtained as a moving image.

The control section 14 plays back frame by frame the plurality of frame images obtained as the moving image (step S902), and determines whether first selection of frame images to be measured is accepted via the input device 3 based on the frame images played back frame by frame (step S903). When the control section 14 determines that the selection is not accepted (step S903: NO), the control section 14 waits for the acceptance of the selection. Examples of the selected and accepted frame images are frame images whose target point indicates a movement start time point, and frame images showing a time point at which amplitude is maximum at one end in the case of amplitude.

When the control section 14 determines that the selection is accepted (step S903: YES), the control section 14 determines whether the selection of frame images to be measured is accepted via the input device 3 (step S904). When the control section 14 determines that the selection is not accepted again (step S904: NO), the control section 14 waits for the acceptance of the selection. Examples of the frame images that are again selected and accepted include frame images whose target point indicates a time point at which the motion is ended, and frame images showing a time point at which amplitude is maximum at the other end in the case of amplitude.

When the control section 14 determines that the selection is accepted (step S904: YES), the control section 14 generates a synthesized image obtained by superimposing the selected and accepted frame images, and displays the superimposed images on the display device 11 (step S905). The control section 14 measures a predetermined physical quantity on the displayed synthesized image, and displays a measured result on the display device 11 (step S906).

As described above, according to the first embodiment, since the selected and accepted frame images are still images, the synthesized image obtained by superimposing the still images is also a still image. Therefore, the measuring method for still images can be applied even to an object to be measured that moves as time elapses or to an object to be measured having a complicated shape. As a result, a desired physical quantity, such as a moving distance, a speed, or acceleration can be measured without a complicated image process.

Second Embodiment

Since a configuration of the image measuring device 1 according to a second embodiment of the present invention is similar to that in the first embodiment, the same reference symbols are given so that detailed description thereof is omitted. The second embodiment is different from the first embodiment in that accurate calibration can be performed at the time of measuring a physical quantity.

Figure 10:
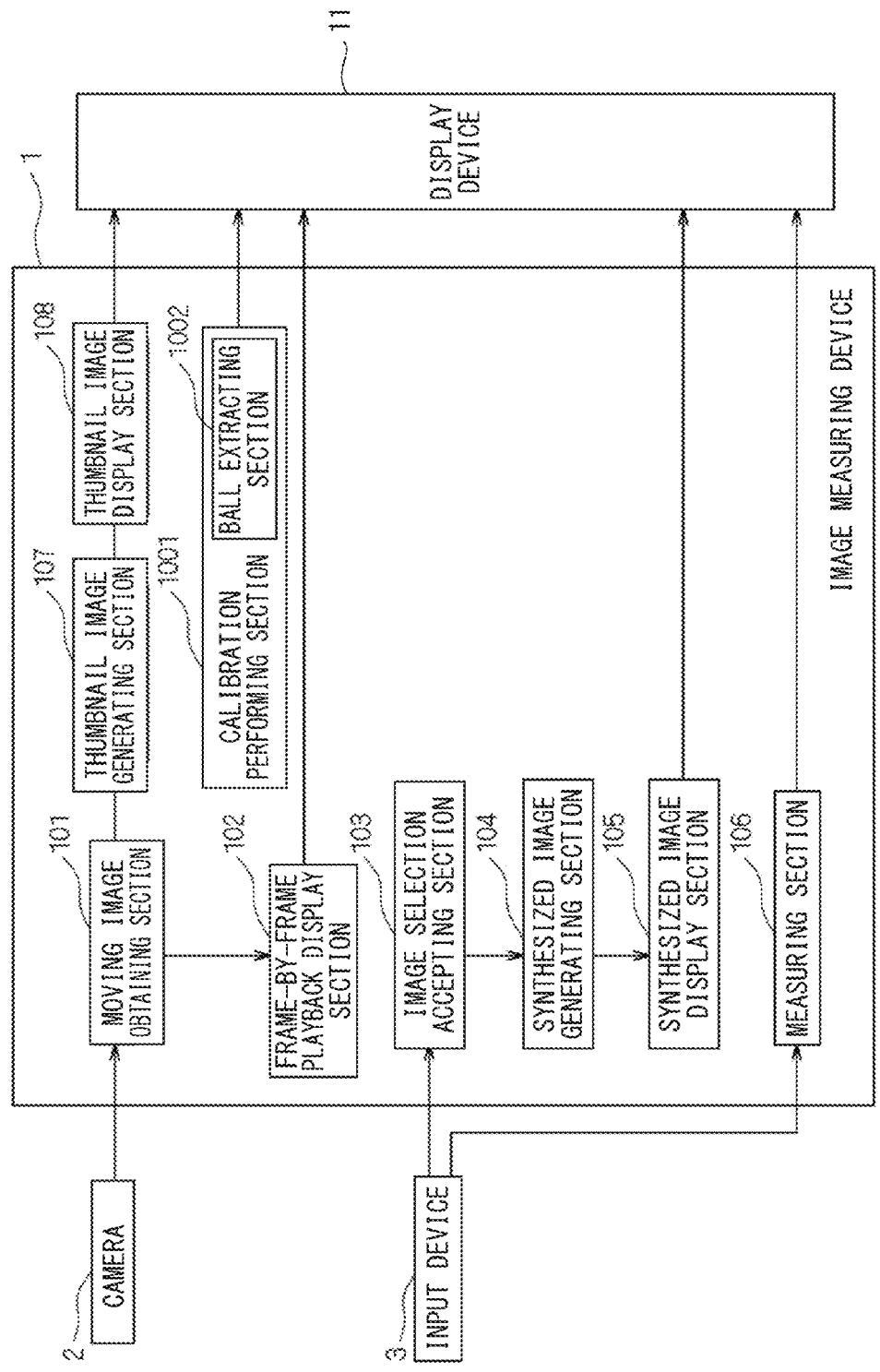
FIG. 10 is a functional block diagram illustrating one configuration example of the image measuring device according to a second embodiment of the present invention.

FIG. 10 is a functional block diagram illustrating one configuration example of the image measuring device 1 according to the second embodiment of the present invention. As shown in FIG. 10, the image measuring device 1 according to the second embodiment of the present invention has the same configuration as that of the image measuring device 1 according to the first embodiment shown in FIG. 3 except that a calibration performing section 1001 is provided.

The calibration performing section 1001 arranges a ball, whose dimension is well known, so that the ball appears on a moving image of an object to be measured, and performs calibration based on a moving image obtained by capturing the object to be measured and the ball by the camera 2. Specifically, a ball extracting section 1002 extracts the ball from the obtained moving image. A ratio $\mu$ of an absolute distance r of a diameter of the extracted ball on a display screen to a well-known diameter R of the ball ($\mu=R/r$) is calculated, and is stored in the storage device 16.

In order to arrange the ball near the object to be measured, for example, the ball is provided on an edge of a bar and the ball may be extended near the object to be measured at the time of capturing the moving image. At this time, it is important to make an adjustment so that distances from the camera 2 to the object to be measured and the ball are equal to each other.

Figure 11:
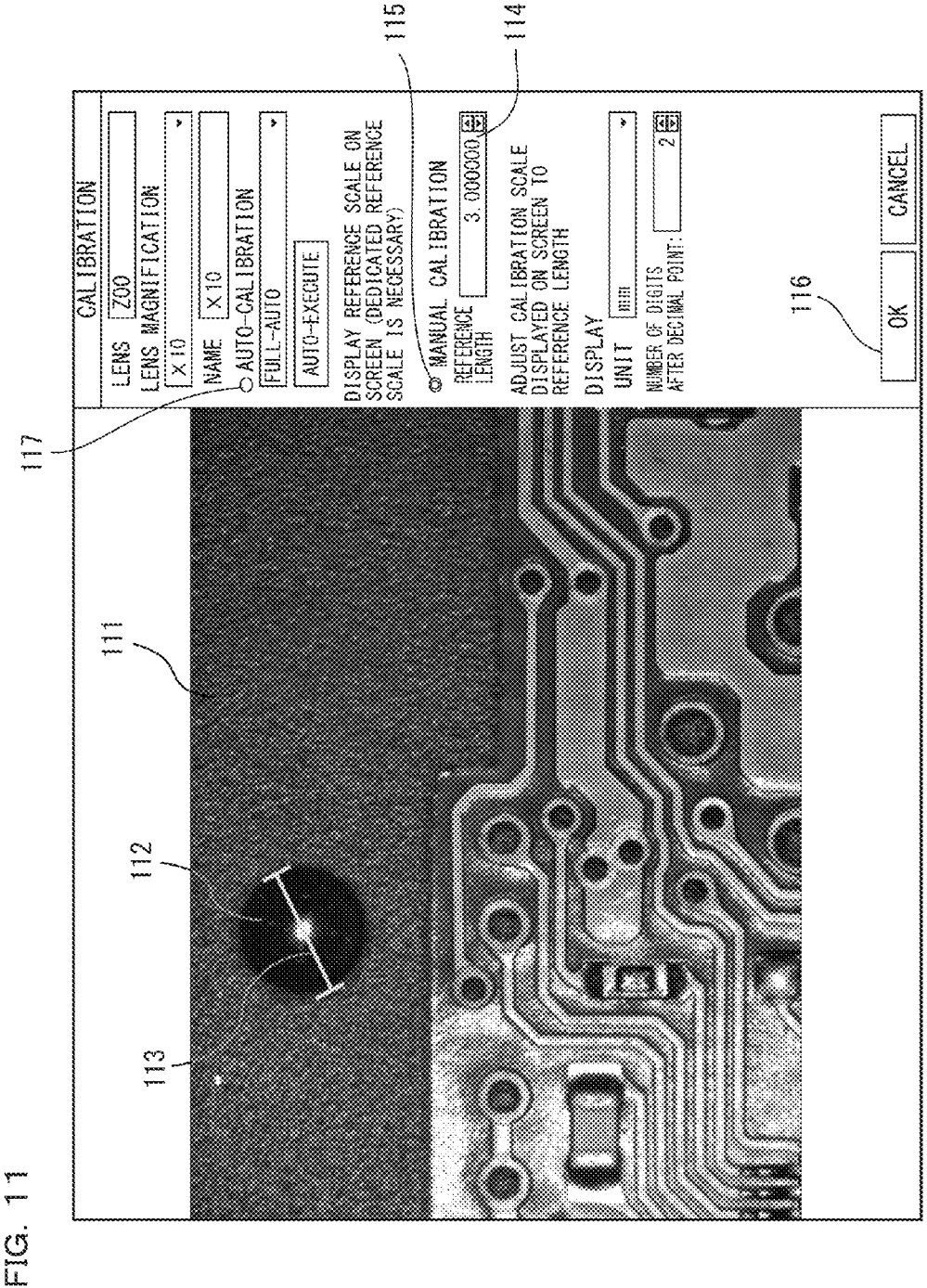
FIG. 11 is an illustrative diagram illustrating a calibration performing screen of the image measuring device according to the second embodiment of the present invention.

As a result, the distance r1 between the camera 2 and the object to be measured on the display screen is multiplied by the ratio μ so that a real scale value P (=μ×r1) can be obtained. Thus, the accurate calibration can be performed. FIG. 11 is an illustrative diagram illustrating a calibration performing screen of the image measuring device 1 according to the second embodiment of the present invention.

In FIG. 11, the object to be measured is displayed together with a ball 112 on a measurement object display region 111. When the calibration is performed manually, a "manual calibration" selecting button 115 is selected, and "3 mm", that is a length of the diameter of the actual ball, is input as a reference length into a reference length input region 114.

The ball is extracted from frame images displayed on the measurement object display region 111, and a calibration scale 113 is set on the diameter on the extracted ball 112. An "OK" button 116 is selected. As a result, the ratio μ of the absolute distance r of the diameter of the extracted ball 112 to the well-known diameter R of the actual ball (μ=R/r) can be calculated, thereby easily performing the calibration.

Figure 12:
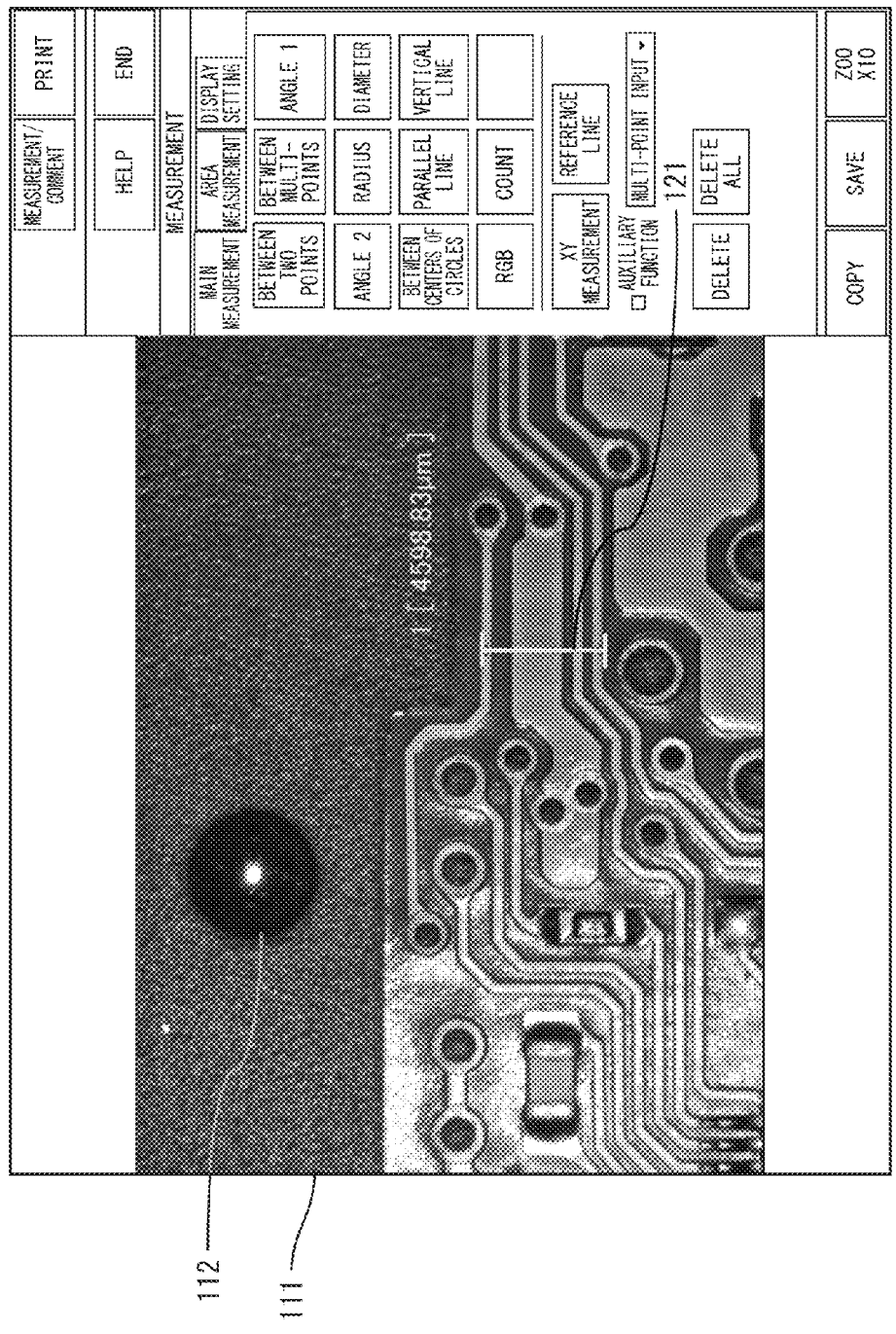
FIG. 12 is an illustrative diagram illustrating a measurement screen after the calibration is performed, in the image measuring device according to the second embodiment of the present invention.

FIG. 12 is an illustrative diagram illustrating a measurement screen after the calibration is performed in the image measuring device 1 according to the second embodiment of the present invention. In FIG. 12, "(distance measurement) between two points" is selected as an item to be measured, and a distance of a measurement object display 121 indicating which distance is to be measured is measured so that a measured result is displayed.

When the calibration is automatically performed, in FIG. 11, an "auto calibration" selecting button 117 is selected, and "3 mm", that is the length of he diameter of the actual ball is set as a reference length in advance. The ball 112 is extracted from the obtained moving image, and the absolute distance r of the diameter of the ball 112 on the display screen is obtained. As a result, the ratio μ is calculated so that the calibration is automatically performed.

Figure 13:
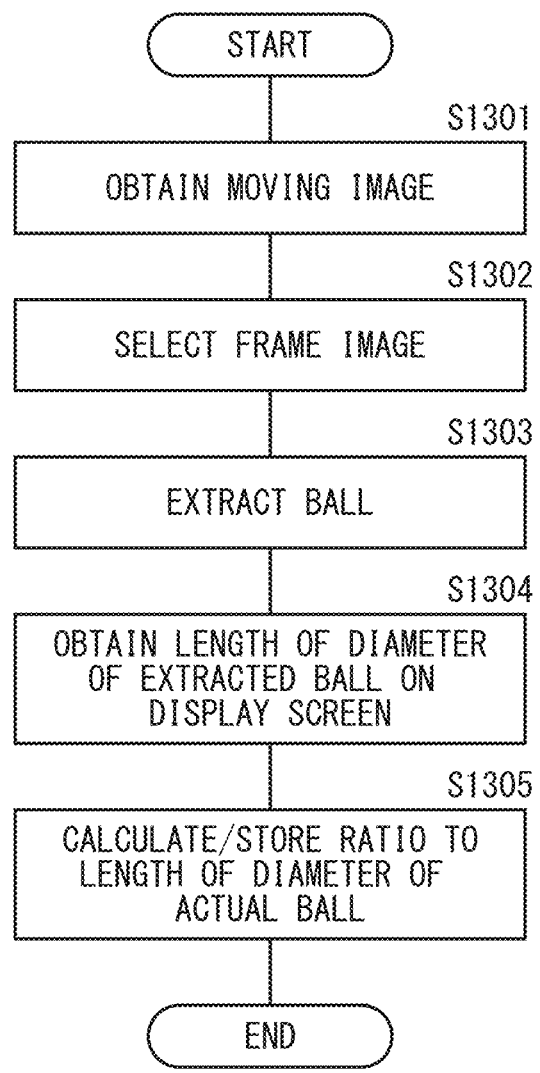
FIG. 13 is a flowchart illustrating a procedure of an automatic calibration process in the control section of the image measuring device according to the second embodiment of the present invention.

FIG. 13 is a flowchart illustrating an auto calibration process in the control section 14 of the image measuring device 1 according to the second embodiment of the present invention. In FIG. 13, a ball whose dimension is well known is arranged so that the distance from the camera 2 to the ball is equal to the distance from the camera 2 to an object to be measured. The camera 2 captures the object to be measured so that the ball is photographed on the frame image of the object to be measured.

The control section 14 of the image measuring device 1 obtains a moving image including a plurality of frame images where the captured ball and object to be measured appear (step S1301). The control section 14 selects one frame image from the obtained moving image (step S1302), and the ball is extracted from the selected frame image (step S1303).

The control section 14 specifies a diameter of the extracted ball, and obtains a length of the diameter on the display screen (step S1304). The control section 14 calculates a ratio of the length of the obtained diameter on the display screen to a length of the diameter of the actual ball input as the reference length in advance, and stores the ratio in the storage device 16 (step S1305).

Figure 14B:
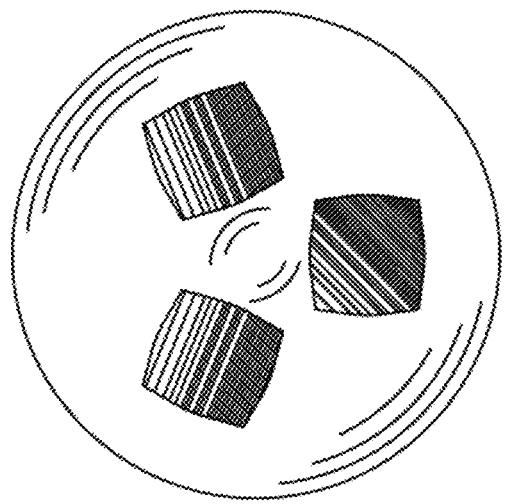
FIGS. 14A and 14B are illustrative diagrams illustrating patterns to be given to a surface of a ball of the image measuring device according to the second embodiment of the present invention.
Figure 14A:
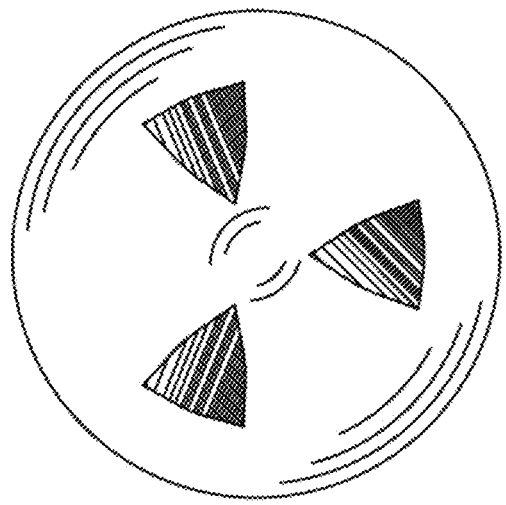

A pattern for enabling discrimination is given to a surface of the ball, and the pattern is detected. The calibration is performed based on the detected pattern, and a dimension of the pattern is automatically recognized so that the calibration can be automatically performed. FIGS. 14A and 14B are illustrative diagrams illustrating patterns to be given to the surface of the ball of the image measuring device 1 according to the second embodiment of the present invention.

The pattern to be given to the ball may be, as shown in FIG. 14A, an equilateral triangle whose dimension is well known, or as shown in FIG. 14B, a rectangle whose dimension is well known. With any of the above, the pattern whose dimension is well known can be detected, and the calibration can be accurately performed based on the detected pattern.

Further, in order to reliably extract the ball from the obtained moving image (frame images), the ball may be illuminated by using an LED or the like. If the ball is illuminated, the ball can be easily extracted, and the calibration can be accurately performed.

According to the second embodiment of the present invention, even if the image capturing is performed from any direction, the ball captured as a circular shape on a two-dimensional image is used as a reference at the time of performing the calibration. As a result, accurate calibration can be performed.

The present invention is not limited to the above embodiments, and can be variously changed and improved within a range of the gist of the present invention. For example, the pattern to be given to the ball is not limited to the patterns shown in FIGS. 14A and 14B, and thus is not particularly limited as long as it is a pattern whose dimension is easily measured.

What is claimed is:

1. An image measuring device for measuring a physical quantity based on a moving image including a plurality of frame images obtained by capturing an object to be measured by an imaging unit, the device comprising:
an input device;
a frame-by-frame playback unit configured to play back the frame images frame by frame;
an image selection accepting unit configured to accept a manual selection of a subset of frame images through the input device from the frame images played back frame by frame;
a synthesized image generating unit configured to generate a synthesized image obtained by superimposing the subset of frame images;
a display unit for displaying the synthesized image; and
a measuring unit configured to measure a physical quantity on the synthesized image by accepting a manual selection of a measuring tool and a manual selection of an object to be measured in the synthesized image through the input device.

2. The image measuring device according to claim 1, wherein the frame-by-frame playback unit sequentially superimposes the frame images to be played back frame by frame on the frame image firstly accepted of the manual selection.

3. The image measuring device according to claim 1, further comprising:
a thumbnail image generating unit configured to generate thumbnail images of the subset of frame images; and
wherein the display is configured to further display the generated thumbnail images together with an identification information representing one of the subset of frame images.

4. The image measuring device according to claim 1, wherein a profile image to which a profile line is given is superimposed on the subset of frame images, and the superimposed images are displayed.

5. The image measuring device according to claim 1, wherein the display unit is configured to further display the measured physical quantity together with a time difference between the subset of frame images.

6. The image measuring device according to claim 1, wherein a ball whose dimension is well known is arranged so as to appear on the moving image of the object to be measured, and calibration is performed based on the moving image obtained by capturing the object to be measured and the ball by the imaging unit.

7. The image measuring device according to claim 6, further comprising
a ball extracting unit for extracting the ball from the obtained moving image, wherein
the calibration is performed based on the extracted ball.

8. The image measuring device according to claim 6, wherein
a pattern capable of being discriminated is given to a surface of the ball, and
the pattern is detected and the calibration is performed based on the detected pattern.

9. The image measuring device according to claim 6, wherein the ball is illuminated.

10. An image measuring method which is executed by an image measuring device for measuring a physical quantity based on a moving image including a plurality of frame images obtained by capturing an object to be measured by an imaging unit, the method comprising:
providing an input device;
playing back the frame images frame by frame;
accepting a manual selection of a subset of frame images through the input device from the frame images played back frame by frame;
generating a synthesized image obtained by superimposing the subset of frame images;
displaying the synthesized image on a display; and
measuring a physical quantity on the synthesized image by accepting a manual selection of a measuring tool and a manual selection of an object to be measured in the synthesized image through the input device.

11. The image measuring method according to claim 10, wherein the frame images to be played back frame by frame are sequentially superimposed on the frame images firstly accepted of the manual selection.

12. The image measuring method according to claim 10, further comprising:
generating thumbnail images of the subset of frame images; and
displaying the generated thumbnail images together with an identification information representing one of the subset of frame images on the display.

13. The image measuring method according to claim 10, wherein a profile image to which a profile line is given is superimposed on the subset of frame images, and the superimposed images are displayed.

14. The image measuring method according to claim 10, wherein the measured physical quantity is displayed together with a time difference between the subset of frame images.

15. The image measuring method according to claim 10, wherein a ball whose dimension is well known is arranged so as to appear on the moving image of the object to be measured, and calibration is performed based on the moving image obtained by capturing the object to be measured and the ball by the imaging unit.

16. The image measuring method according to claim 15, further comprising:
a ball extracting step of extracting the ball from the obtained moving image, wherein the calibration is performed based on the extracted ball.

17. The image measuring method according to claim 15, wherein a pattern capable of being discriminated is given to a surface of the ball, and the pattern is detected and the calibration is performed based on the detected pattern.

18. The image measuring method according to claim 15 wherein the ball is illuminated.

19. A computer program on a non-transitory computer-readable medium which is executed by an image measuring device for measuring a physical quantity based on a moving image including a plurality of frame images obtained by capturing an object to be measured by an imaging unit, the computer program for causing the image measuring device to function as:
playing back the frame images frame by frame;
accepting a manual selection of a subset of frame images through an input device from the frame images played back frame by frame;
generating a synthesized image obtained by superimposing the subset of frame images;
displaying the synthesized image on a display; and
measuring a physical quantity on the synthesized image by accepting a manual selection of a measuring tool and a manual selection of an object to be measured in the synthesized image through the input device.

* * * * *